United States Patent [19]

Uehara et al.

[11] Patent Number: 5,383,625
[45] Date of Patent: Jan. 24, 1995

[54] REEL HOLDER FOR USE IN TAPE WINDING APPARATUS

[75] Inventors: Seigo Uehara, Fujisawa; Hideharu Tsukamoto, Hachioji, both of Japan

[73] Assignee: Sony Magnescale Inc., Tokyo, Japan

[21] Appl. No.: 109,536

[22] Filed: Aug. 20, 1993

[30] Foreign Application Priority Data

Aug. 31, 1992 [JP] Japan .................. 4-232344

[51] Int. Cl.⁶ .......................................... B65H 75/24
[52] U.S. Cl. ..................... 242/572; 242/574.4
[58] Field of Search ............ 242/572, 573, 574, 574.4, 242/573.9; 279/2.16, 2.18; 269/48.1, 48.2, 48.3, 48.4; 82/169

[56] References Cited

U.S. PATENT DOCUMENTS

| | | | |
|---|---|---|---|
| 3,366,343 | 1/1968 | Messamer et al. | 242/574 |
| 3,404,896 | 10/1968 | Stace et al. | 279/2.18 |
| 4,284,250 | 8/1981 | Plachy et al. | 242/573 |
| 4,747,555 | 5/1988 | Bosco et al. | 242/574.4 |

FOREIGN PATENT DOCUMENTS 2064362 7/1972 Germany .
1148878 4/1969 United Kingdom .

*Primary Examiner*—John M. Jillions
*Attorney, Agent, or Firm*—Foley & Lardner

[57] ABSTRACT

A reel holder for use in a tape winding apparatus comprises a cylindrical drum unit which is rotated by the tape winding apparatus. A plurality of lock pins are radially movably mounted in a peripheral portion of the drum unit. Each each lock pin is axially movable between a projected position wherein an outer end thereof is projected outwardly from a cylindrical outer wall of the drum unit and a retracted position wherein the outer end thereof is retracted into the drum unit. First and second buttons are mounted on an axial end of the drum unit. Each button is movable in parallel with the axis of the drum unit between raised and depressed positions with respect to the axial end of the drum unit. A transmission device is installed in the drum unit and operated in such a manner as to move the lock pins to the projected position when the first button is moved to the depressed position and permit the lock pins to return to the retracted position when the second button is moved to the depressed position.

18 Claims, 7 Drawing Sheets

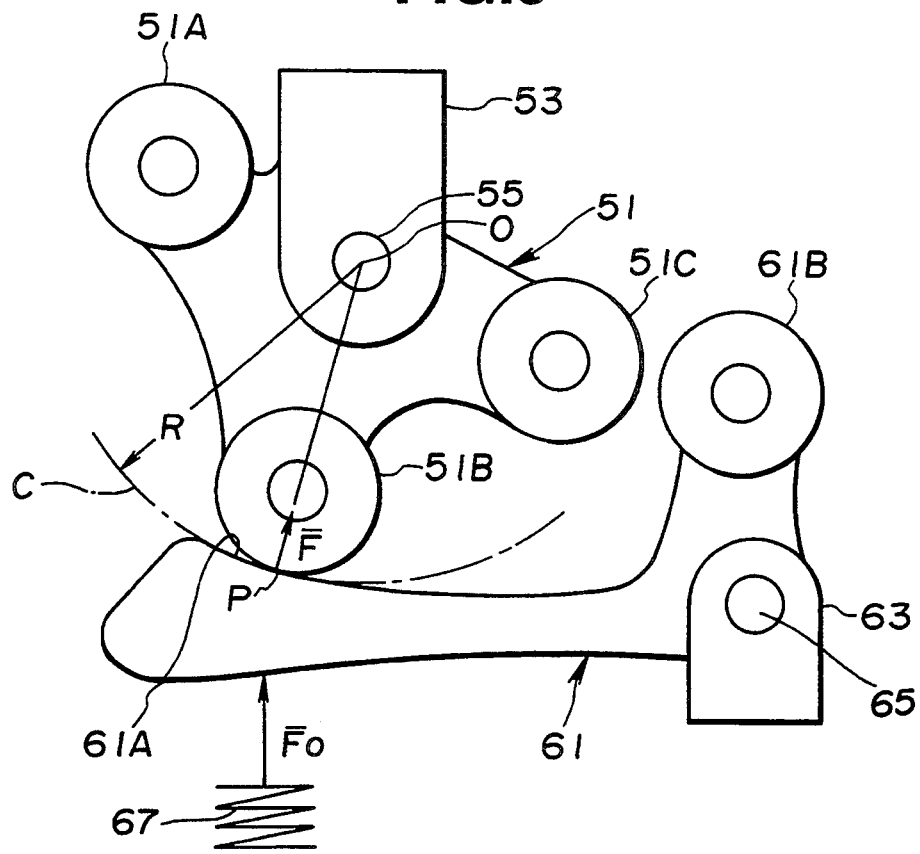
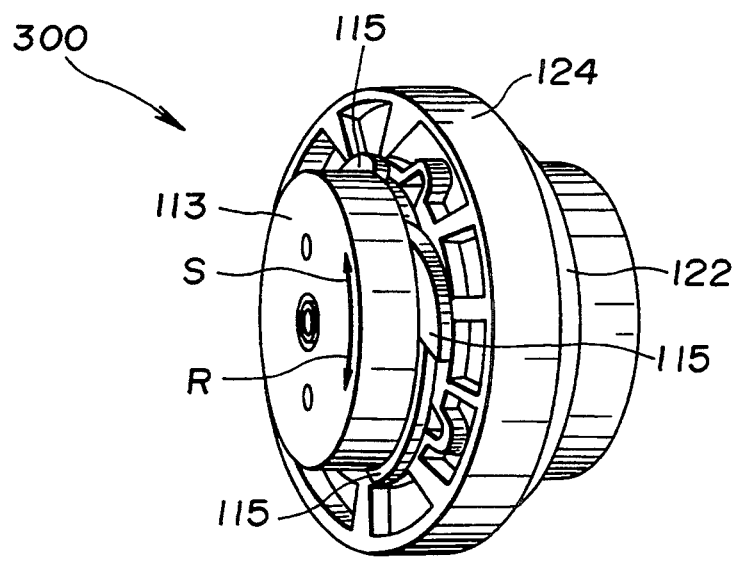

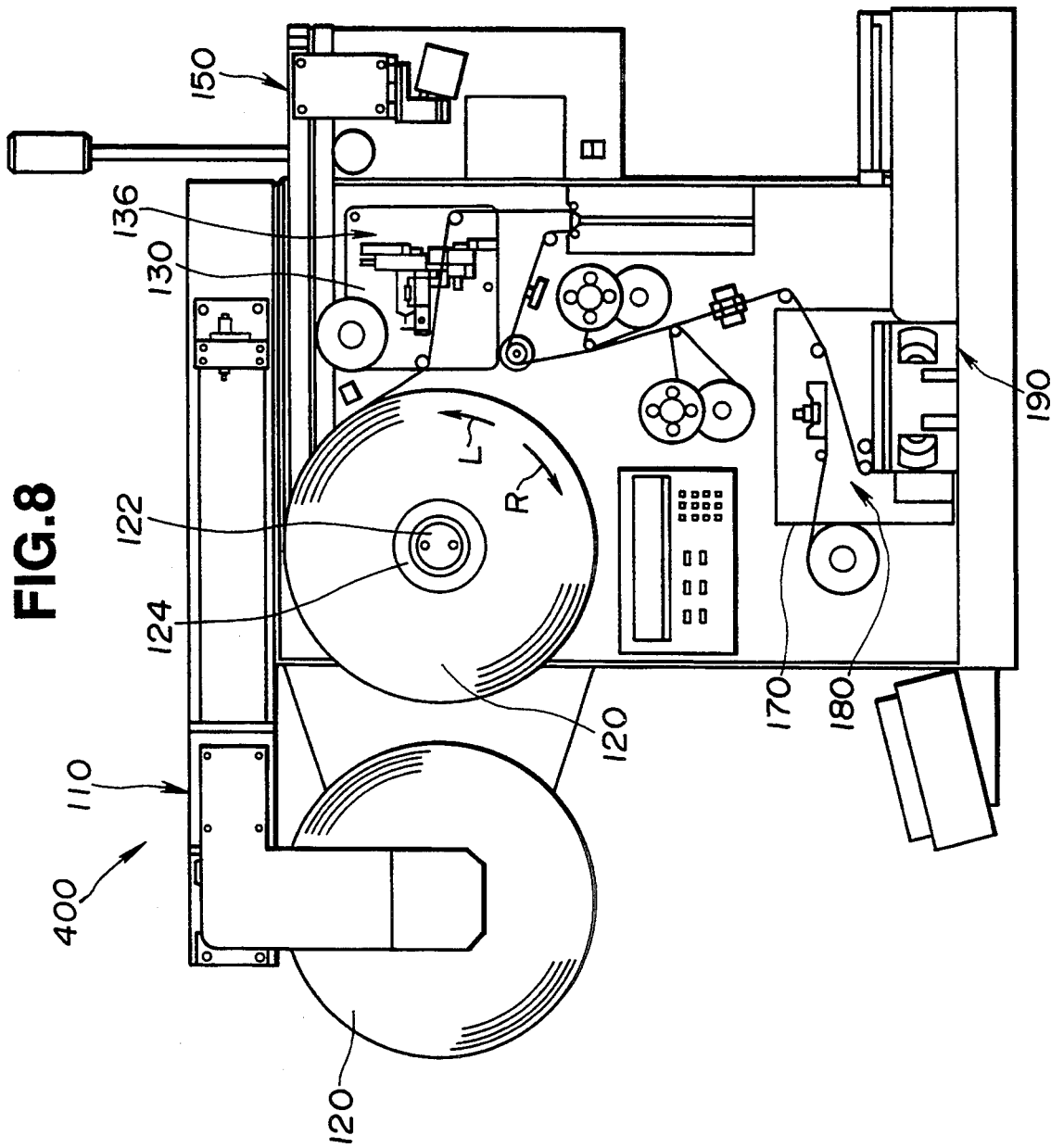

REEL HOLDER FOR USE IN TAPE WINDING APPARATUS

BACKGROUND OF THE INVENTION

1. Field of the Invention

The present invention relates in general to holders for holding a rotating member, and more particularly to reel holders for use in tape winding apparatus. More specifically, the present invention is concerned with pancake reel holders for use in tape winding apparatus of a type which winds a longer tape as wrapped around a pancake reel into video cassettes or the like.

2. Description of Related Applications

The present invention has relation to both U.S. patent application Ser. No. 07/957,473 filed on Oct. 7, 1992 by the same applicant and U.S. patent application Ser. No. 08/038,675 filed on Mar. 26, 1993 by the same applicant. The former U.S. application is based on Japanese Patent Application 260386/1991 (filed Oct. 8, 1991), Japanese Patent Application 285072/1991 (filed Oct. 30, 1991) and Japanese Patent Application 302033/1991 (filed Nov. 18, 1991) claiming the priority of the same, while the latter U.S. application is based on Japanese Patent Application 80074/1992 (filed Apr. 1, 1992) and Japanese Patent Application 80072/1992 (filed Apr. 1, 1992) claiming the priority of the same.

In order to clarify the task of the present invention, a reel holder described in the above-mentioned U.S. patent application Ser. No. 07/957,473 will be outlined with reference to FIG. 7 of the accompanying drawings prior to making a detailed description on the present invention.

In FIG. 7, the reel holder 300 is shown as carrying thereon a reel hub 124. Although not shown in the drawing, a longer tape is to be wound around the reel hub 124 to constitute a so-called "pancake reel" (120, see FIG. 8).

In the drawing (FIG. 7), the reel holder 300 generally comprises a reel base 122 which is a part of a tape winding apparatus (not shown) and rotated about its axis. The reel hub 124 is detachably put on the reel base 122 through three pawl members 115 which are incorporated with a knob 113. The three pawls 115 can be radially expanded and contracted in response to rotation of the knob 113. That is, when the knob 113 is turned in the direction of the arrow "R", the pawls 115 are expanded to grasp the reel hub 124. With this, the reel hub 124 is held by the reel base 122. While, when the knob 113 is turned in the direction of the arrow "L", the pawls 115 are contracted to release the reel hub 124. With this, the reel hub 124 can be removed from the reel base 122.

Although not shown in the drawing, the reel hub 124 has at a cylindrical inner wall of the center bore thereof an axially extending groove, and the reel base 122 is formed with a corresponding projection. Upon proper fitting of the reel hub 124 onto the reel base 122, the groove and the projection are mated to prevent relative rotation therebetween. Thus, under his condition, the reel hub 124 and the reel holder 300 can rotate like a single unit.

FIG. 8 shows a tape winding apparatus to which the above-mentioned reel holder is practically applied. The tape winding apparatus is described in the above-mentioned U.S. patent application Ser. No. 08/038,675.

As shown in the drawing, the tape winding apparatus 400 comprises generally a pancake reel autochanger 110, a second splicing device 130, a tape terminal end processing device 136, a tape front end withdrawing device 150, a first splicing device 170, a tape withdrawing and winding device 180 and a cassette loading device 190.

As shown, the reel base 122 on which the reel hub 124 as the pancake reel 120 is disposed is a part of the tape winding apparatus 400. The detail of the tape winding apparatus 400 is described in the U.S. patent application Ser. No. 08/038,657.

SUMMARY OF THE INVENTION

It is an object of the present invention to provide a reel holder which can be used as a substitute for the above-mentioned reel holder disclosed in U.S. patent application Ser. No. 07/957,473.

It is another object of the present invention to provide a reel holder which is superior in handling to the reel holder of U.S. patent application Ser. No. 07/957,473.

It is a further object of the present invention to provide a reel holder onto which a pancake reel can be put with easy fitting steps.

It is a still further object of the present invention to provide a reel holder which can assuredly hold a pancake reel thereon.

According to the present invention, there is provided a holder which comprises a cylindrical base body; a plurality of lock pins radially movably mounted in a peripheral portion of the cylindrical base body, each lock pin being axially movable between a projected position wherein an outer end thereof is projected outwardly from a cylindrical outer wall of the base body and a retracted position wherein the outer end thereof is retracted into the base body; first and second buttons mounted on an axial end of the cylindrical base body, each button being movable in parallel with the axis of the cylindrical base body between raised and depressed positions with respect to the axial end; and a transmission device installed in the cylindrical base body and operated in such a manner as to move the lock pins to the projected position when the first button is moved to the depressed position and return the lock pins to the retracted position when the second button is moved to the depressed position.

According to the present invention, there is further provided a reel holder for use in a tape winding apparatus having a rotation shaft. The reel holder comprises a cylindrical drum unit coaxially connected at one axial end thereof to the rotation shaft to rotate therewith; a plurality of lock pins radially movably mounted in a peripheral portion of the drum unit, each lock pin being axially movable between a projected position wherein an outer end thereof is projected outwardly from a cylindrical outer wall of the drum unit and a retracted position wherein the outer end thereof is retracted into the drum unit; an elastic band put around the cylindrical outer wall in a manner to cover the outer ends of the lock pins, the elastic band biasing the lock pins toward the retracted position when the lock pins are projected; a circular button coaxially disposed on the other axial end of the cylindrical drum unit, the circular button having raised and depressed positions with respect to the other axial end; an annular button coaxially disposed on the other axial end of the cylindrical drum unit in a manner to concentrically surround the circular button, the annular button having raised and depressed positions with respect to the other axial end; and a plurality of transmission mechanisms installed in the drum unit and respectively incorporated with the lock pins, each transmission mechanism moving the corresponding lock pin to the projected position against a biasing force of the elastic band when actuated by the circular button and permitting the lock pin to return to the retracted position with an aid of the biasing force of the elastic band when actuated by the annular button.

BRIEF DESCRIPTION OF THE DRAWINGS

Other objects and advantages of the present invention will become apparent from the following description when taken in conjunction with the accompanying drawings, in which:

FIG. 5 is an illustration of a swing lever and a press lever, schematically depicting relative positioning therebetween;

FIG. 7 is a perspective view of a reel holder which is described in U.S. patent application Ser. No. 07/957,473; and FIG. 8 is a front view of a tape winding apparatus which is described in U.S. patent application Ser. No. 08/038,675.

DETAILED DESCRIPTION OF THE INVENTION

Figure 1:
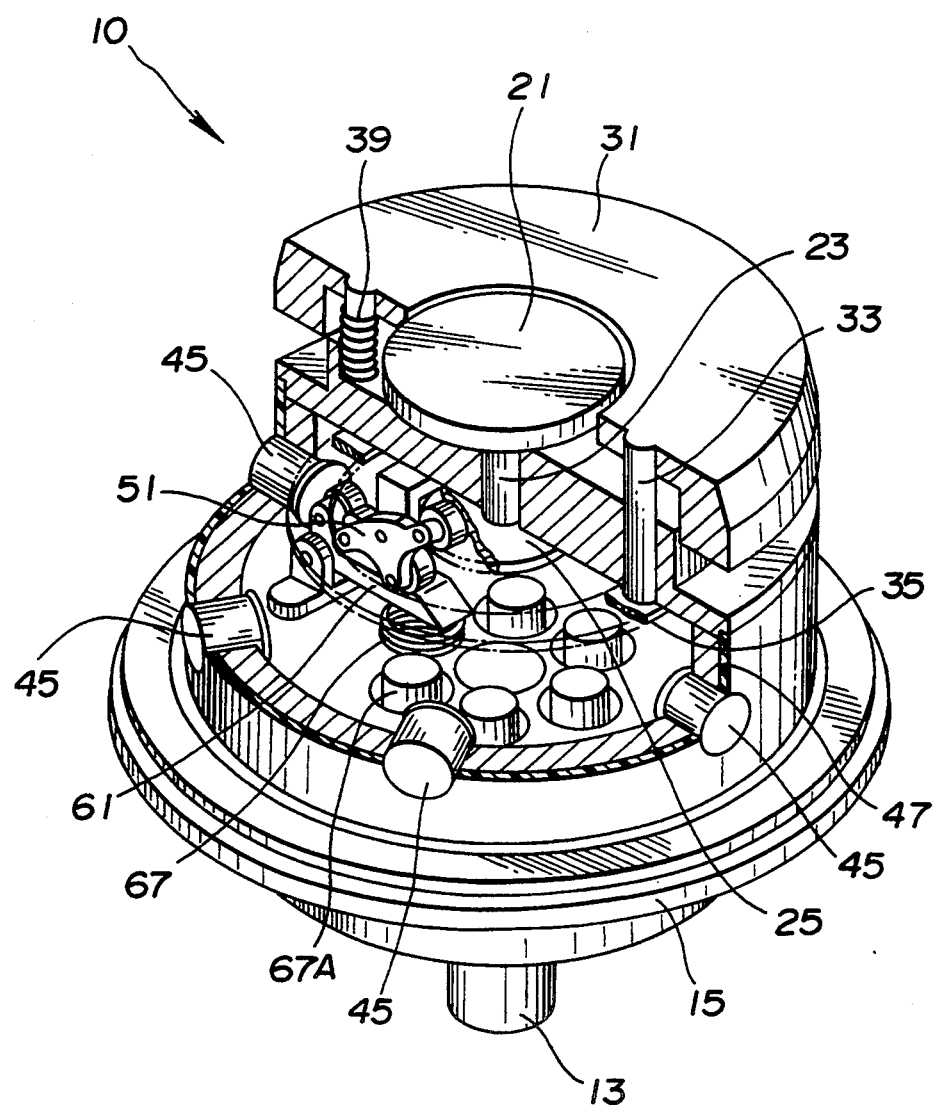
FIG. 1 is a partially cut perspective view of a reel holder according to the present invention, with some parts being removed for clarification of the drawing.
Figure 2:
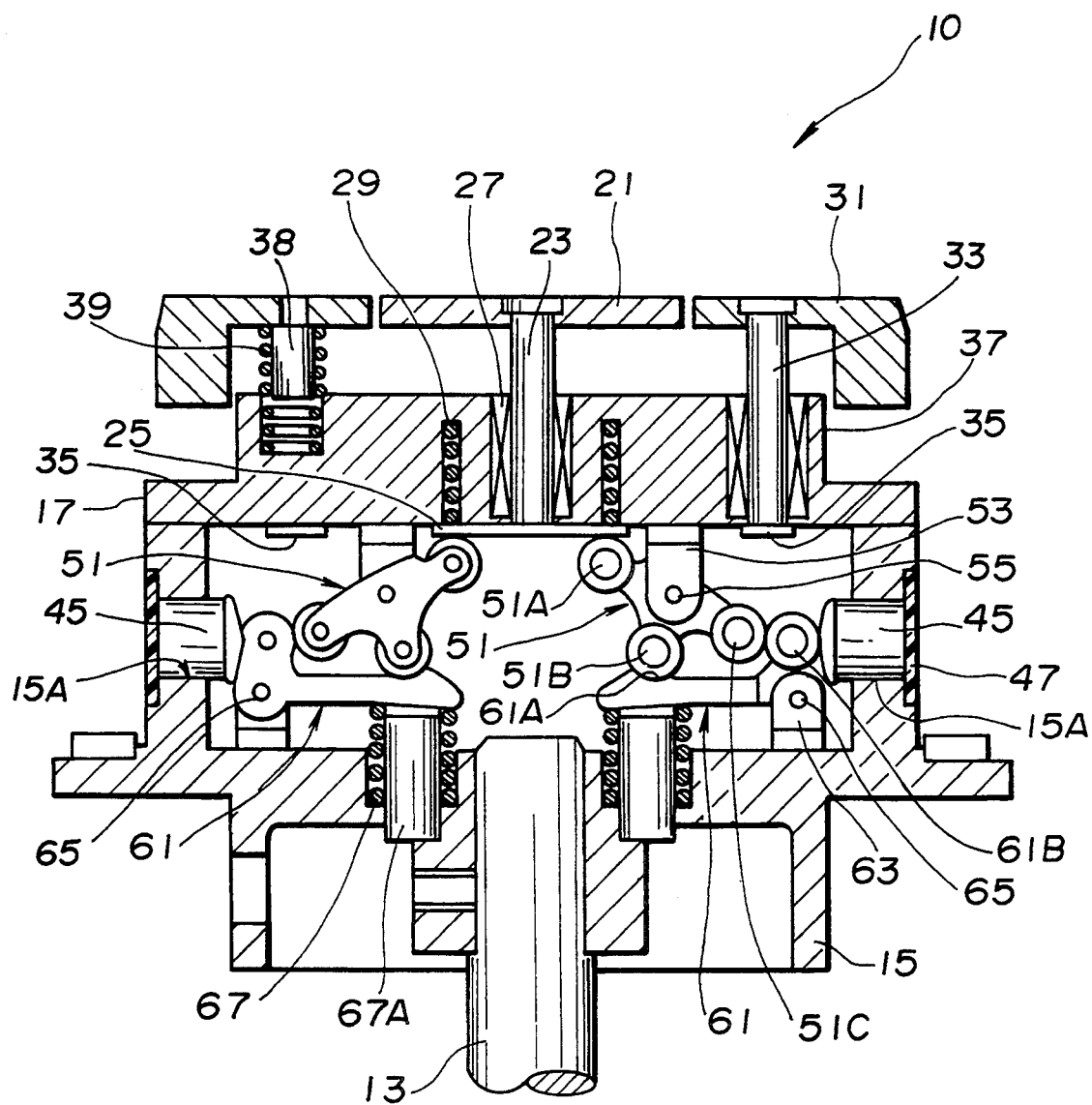
FIG. 2 is a sectional view of the reel holder of the present invention.
Figure 3:
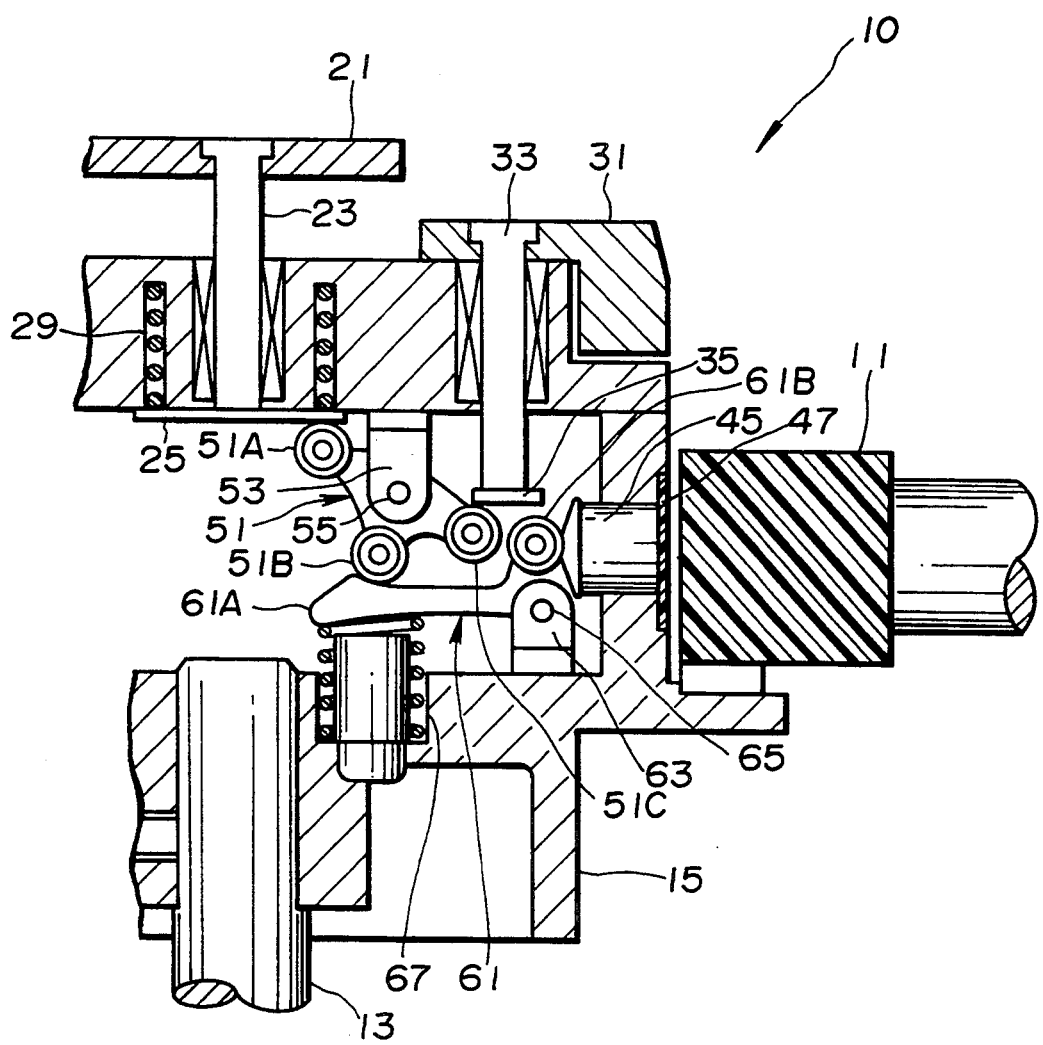
FIGS. 3 and 4 are sectional views of a part of the reel holder of the present invention, showing different conditions of the reel holder.

Referring to FIGS. 1 to 6, particularly FIGS. 1 and 2, there is shown a reel holder according to the present invention, which is generally designated by numeral 10.

It is to be noted that FIG. 1 lacks some parts of the reel holder for clarification of the drawing.

In FIGS. 1 and 2, the reel holder 10 of the invention is shown as being mounted on a rotation shaft 13. The rotation shaft 13 is a part of a tape winding apparatus, such as, a part of the afore-mentioned tape winding apparatus 400 as shown in FIG. 8. That is, the rotation shaft 13 is rotated about its axis under a given condition of the tape winding apparatus.

The reel holder 10 comprises a cylindrical rotation drum 15 coaxially connected to the rotation shaft 13 to rotate therewith. As will become apparent as the description proceeds, the rotation drum 15 carries thereon a pancake reel (not shown) and rotates the same. For putting the pancake reel onto the rotation drum 15, manual or automatic operation is used.

As is seen from FIG. 2, the rotation drum 15 has at an axially front (or upper, as viewed in the drawing) end thereof a drum cover 17 mounted thereto. Thus, a drum unit (15+17) is constituted, which has an internal space.

As is seen from FIGS. 1 and 2, above the drum cover 17, there are arranged both a circular lock button 21 and an annular release button 31. The release button 31 concentrically surrounds the lock button 21. The outer diameter of the release button 31 is equal to or smaller than the diameter of the cylindrical outer wall of the rotation drum 15.

As shown in FIG. 2, the lock button 21 is fixed to a front end of a lock spindle 23 which is slidably received in a center bore (no numeral) formed in the drum cover 17, while, the release button 31 is fixed to front ends of three release spindles 33 (only one is shown) which are slidably received in three bores (no numerals) which are formed in a peripheral area of the drum cover 17 at evenly spaced intervals. Furthermore, the release button 31 is fixed to front ends of three guide rods 38 which are sized to be received in respective blind bores (no numerals) formed in the drum cover 17. Each blind bore receives a lower portion of a coil spring 39 which is disposed about the guide rod 38 and seated on the release button 31. Due to the work of these three coil springs 39, the release button 31 is biased away from the drum cover 17. The three guide rods 38 and the three release spindles 33 are alternately positioned.

The center bore of the drum cover 17 is provided with a linear bush 27 for achieving a smoothed axial movement of the lock spindle 23 relative to the drum cover 17, and the three peripheral bores of the drum cover 17 are provided with respective linear bushes 37 for achieving a smoothed axial movement of the three release spindles 33 relative to the drum cover 17.

As shown in FIG. 2, all the spindles 23 and 33 have lower ends which are projectable into the interior of the drum unit (15+17). Preferably, front surfaces of the lock button 21 and release button 31 are flush with each other under the illustrated neutral condition of the reel holder 10.

As is best seen in FIG. 1, a smaller circular plate 25 is secured to the inner end the lock spindle 23, and a larger annular plate 35 (as illustrated by phantom line) is secured to lower ends of the three release spindles 33. Thus, the lock button 21, the lock spindle 23 and the smaller circular plate 25 constitute a single unit, and the release button 31, the three release spindles 33 and the larger plate 35 constitute another single unit.

As is seen from FIG. 2, the circular plate 25 is biased downward in the drawing by a coil spring 29 which is received in an annular groove (no numeral) formed in the drum cover 17.

As is understood from FIGS. 1 and 2, the rotation drum 15 is formed at its cylindrical outer wall with six bores 15A which are positioned at equally spaced intervals. Within each bore 15A, there is slidably received a lock pin 45.

As is seen from FIG. 2, a rubber band 47 is put around the cylindrical outer wall of the rotation drum 15 in a manner to cover outer ends of the lock pins 45. Thus, under the neutral condition of the reel holder 10 as shown in this drawing, the lock pins 45 are biased by the rubber band 47 to assume their retracted positions.

Within the drum unit (15+17), there are installed six transmission mechanisms which are arranged am equally spaced intervals and respectively incorporated with the six lock pins 45 and the afore-mentioned smaller circular plate 25 and larger annular plate 35.

As will become apparent as the description proceeds, when the lock button 21 is pushed, the six transmission mechanisms function to cause the lock pins 45 to assume their projected positions (see FIG. 4) against the force of the rubber band 47. While, when then the release button 33 is pushed, the six transmission mechanisms function to cause the lock pins 45 to assume their retracted positions (see FIG. 3) with an aid of the rubber band 47 and to cause the lock button 21 to return to its raised position.

As is best seen from FIG. 2, each transmission mechanism comprises a swing lever 51 which has first, second and third arms each being equipped at a leading end with a roller 51A, 51B or 51C. These rollers 51A, 51B and 51C will be referred to as "first, second and third rollers" hereinafter for ease of understanding. The swing lever 51 is pivotally connected through a pivot pin 55 to a bracket 53 which is secured to the drum cover 17. The first roller 51A is constantly engaged with the smaller circular plate 25 of the lock button 21, and the third roller 51C is engaged with the larger annular ring 35 of the release button 31 under a given condition.

Positioned near the swing arm 51 is a press lever 61 which has a longer first arm and a shorter second arm. The longer first arm has at its enlarged end a cam portion 61A which is engageable with the second roller 51B of the above-mentioned swing arm 51. The shorter second arm of the press lever 61 is equipped at a leading end with a roller 61B which is constantly engaged with an inner end of the corresponding lock pin 45. As shown, the press lever 61 is pivotally connected through a pivot pin 65 to a bracket 63 which is secured to the rotation drum 15.

As is best seen from FIG. 2, the longer first arm of each press lever 61 is biased upward by a coil spring 67 which is disposed about a guide rod 67A tightly held by the rotation drum 15.

In the following, operation of the reel holder 10 of the present invention will be described with reference to the drawings.

For ease of understanding, the description will be commenced with respect to the neutral condition of the reel holder 10 as shown in FIG. 2.

Under this neutral condition, the lock and release buttons 21 and 31 assume their raised inoperative positions, the first roller 51A of each swing lever 51 assumes its uppermost position pressing the smaller circular plate 25 against the inner surface of the drum cover 17, the second roller 51B is engaged with the cam portion 61A of the longer first arm of the press ever 61 causing the longer first arm to assume its lowermost position against the force of the coil spring 67, and the roller 61B of the press ever 61 assumes its innermost position causing the lock pin 45 to assume its retracted position with an aid of the force of the rubber band 47.

Accordingly, in this condition, a hub portion 11 (see FIG. 4) of a pancake reel, such as the pancake reel 120 as shown in FIG. 8, can be easily put on the cylindrical outer wall of the rotation drum 15.

Under this neutral condition of the reel holder 10, the force produced by the six coil springs 67 is much greater than that produced by the coil spring 29, so that the smaller circular plate 25 is forced to assume its uppermost position irrespective of the force of the coil spring 29.

When, with the pancake reel kept put on the rotation drum 15, the lock button 21 is depressed by an external force manually or automatically, the smaller circular plate 25 pushes down the first roller 51A of each swing lever 51. With this, as is seen from FIG. 4, the swing lever 51 is pivoted counterclockwise (in the drawing) in a snap-action manner about the pivot pin 55 disengaging the second roller 51B from the cam portion 61A. Thus, the longer first arm of the press lever 61 is slightly raised by the force of the coil spring 67 causing the roller 61B of the shorter second arm of the press lever 61 to press the lock pin 45 against the force of the rubber band 47. Thus, each lock pin 45 assumes the projected position pressing the rubber band 47 against a cylindrical inner surface of the hub portion 11 of the pancake reel. Thus, under this condition, the pancake reel is tightly held on the rotation drum 15 and thus can rotate therewith like a single unit.

Figure 4:
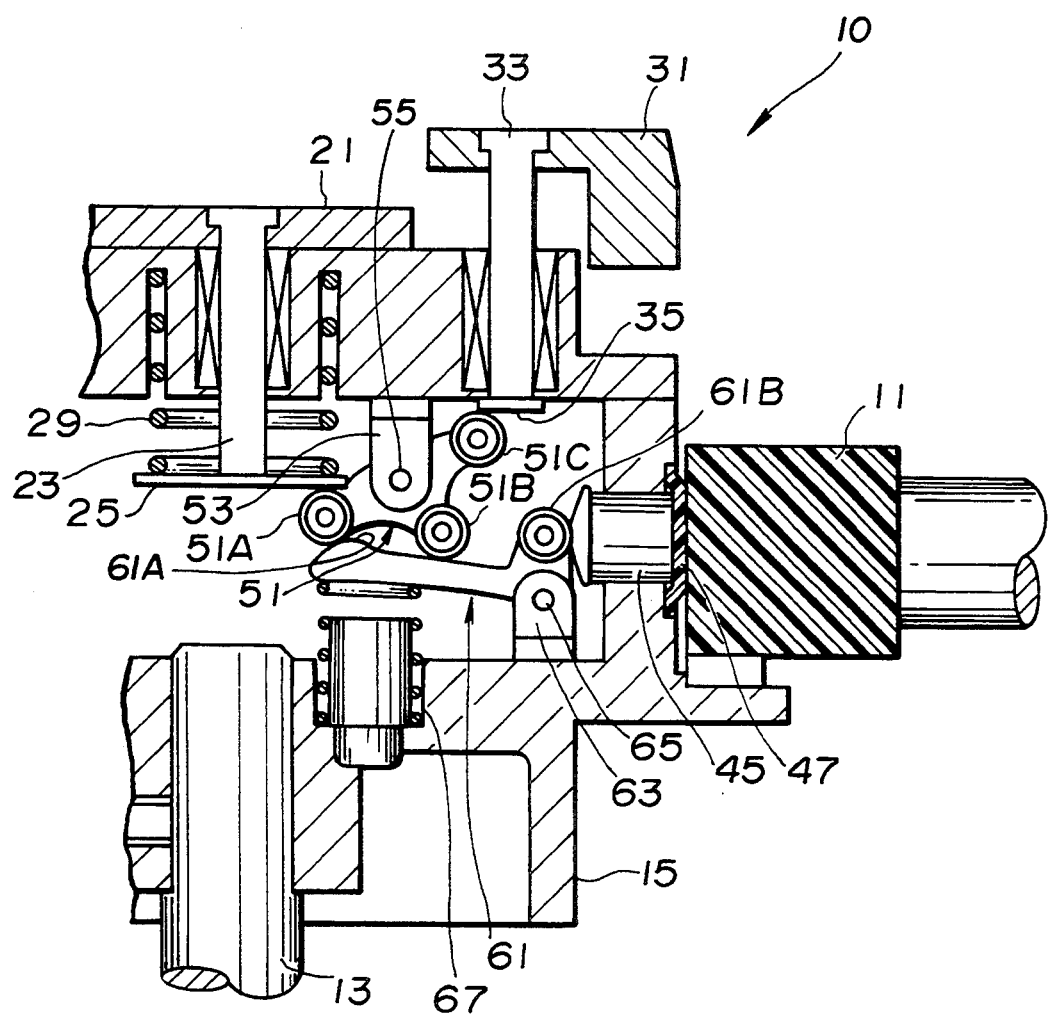

Due to the nature of the snap-action movement of the swing lever 51 thus carried out, the swing lever 51 stays at the depressed position of FIG. 4. As shown in this drawing, due to the force of the coil spring 29, the lock button 21 stays at the depressed position even when the external force is removed therefrom.

When now the release button 31 is depressed by an external force manually or automatically, the annular plate 35 pushes down the third roller 51C of each swing lever 51, as will be understood from FIG. 4. With this, as will be seen from FIG. 3, the swing lever 51 is pivoted clockwise (in FIG. 3) in a snap-action manner about the pivot pin 55 bringing the second roller 51B to the cam portion 61A of the press lever 61 and bringing the first roller 51A to its uppermost position. Thus, the lock button 21 is returned to the raised position against the force of the coil spring 29 and the longer first arm of the press lever 61 is moved to the lowermost position against force of the coil spring 67. That is, the swing lever 51 and the press lever 61 come to the respective positions which they were given when the reel holder 10 assumed the above-mentioned neutral condition of FIG. 2. Thus, the lock pins 45 take the retracted positions releasing the hub portion 11 of the pancake reel.

When thereafter the external force applied to the release button 31 is removed, the release button 31 is returned to the raised position due to the force of the coil springs 38 (see FIG. 2). Thus, the neutral condition of the reel holder 10 is established.

In FIG. 5, there is shown the detail of the swing lever 51 and the press lever 61 under the neutral condition of the reel holder 10. That is, the press lever 61 ms kept pressed down to its lowermost position by the second roller 51B of the swing lever 51.

As shown in the drawing, the cam portion 61A of the press lever 61 constitutes a curved wall which faces toward the pivot center "O" of the swing lever 51. The radius of curvature of the curved wall is "R" which is equal to the distance between the pivot center "O" (more specifically, the axis of the pivot pin 55) and the outermost peripheral portion of the second roller 51B. As is understood from this drawing, under the neutral condition of the reel holder 10 wherein the second roller 51B of the swing lever 51 contacts the cam portion 61A of the press lever 61 at a point "P", an imaginary circle "C" including the curved wall can have its center at the pivot center "O" of the swing lever 51.

With this arrangement, the force "Fo" applied to the press lever 61 by the coil spring 67 produced a force "F" with which the press lever 61 presses the second roller 51B toward the pivot center "0" of the swing lever 51. This means that when the reel holder 10 is under the neutral condition, the swing lever 51 is given no angular moment.

Figure 6A:
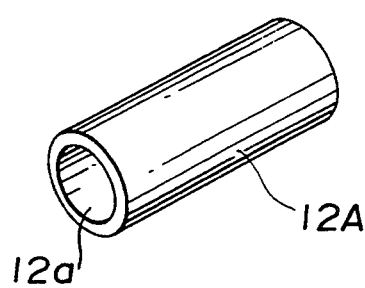
FIGS. 6A, 6A', 6B, 6B', 6C and 6C' are views of various members which can be held by a a holder which is also provided in accordance with the present invention.
Figure 6A:
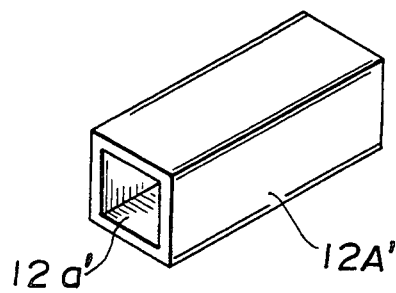
Figure 6B:
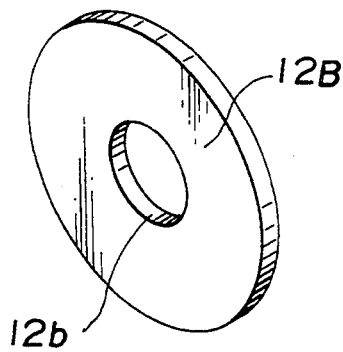
Figure 6B:
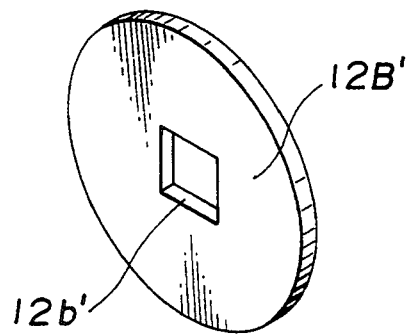
Figure 6C:
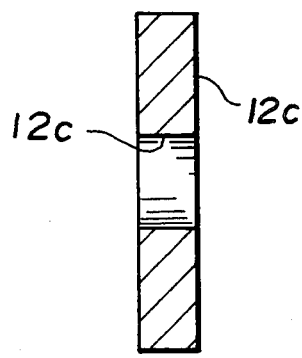
Figure 6C:
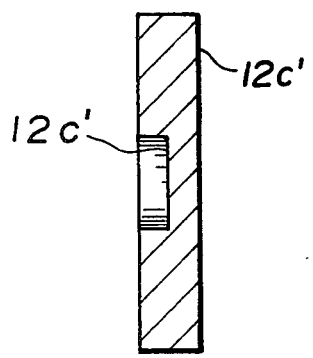

Referring to FIGS. 6A, 6A', 6B, 6B', 6C and 6C', there are shown various members 12 which can be held by the reel holder 10 of the present invention. In fact, in case of the cylindrical members 12A and 12B of FIGS. 6A and 6B each having a cylindrical center bore 12a or 12b, they can be put onto the rotation drum 15 without modifying the reel holder 10 of the invention. That is, by inserting the cylindrical rotation drum 15 into the cylindrical center bore 12a or 12b, the holding is simply achieved. However, in case of the members 12A' and 12B each having a rectangular center bore 12a' or 12b', the rotation drum 15 of the reel holder 10 should be shaped to have a rectangular cross section. As is seen from FIG. 6C', a center recess 12c' may be used in place of the center bore 12c of the member 12C of FIG. 6C. However, in this case, it becomes necessary to change the position of the lock and release buttons 21 and 31 of the reel holder 10.

What is claimed is:

1. A holder comprising:

a cylindrical base body;

a plurality of lock pins radially movably mounted in a peripheral portion of said cylindrical base body, each lock pin being axially movable between a projected position wherein an outer end thereof is projected outwardly from a cylindrical outer wall of said base body and a retracted position wherein said outer end thereof is retracted into said base body;

first and second buttons mounted on an axial end of said cylindrical base body, each button being movable in parallel with the axis of said cylindrical base body between raised and depressed positions with respect to said axial end; and a transmission device installed in said cylindrical base body and operated in such a manner as to move said lock pins to the projected position when said first button is moved to the depressed position and return the lock pins to the retracted position when said second button is moved to the depressed position.

2. A holder as claimed in claim 1 in which said lock pins are arranged in the peripheral portion of said cylindrical base body at positions substantially equally spaced from the center of said base body.

3. A holder as claimed in claim 2, in which said first and second buttons are circular and annular in shape respectively, the annular second button concentrically surrounding the circular first button.

4. A holder as claimed in claim 2, further comprising an elastic band which is put around the cylindrical outer wall of said cylindrical base body in a manner to cover the outer ends said lock pins.

5. A holder as claimed in claim 4, in which said transmission device comprises:

a circular plate moved together with said first button;

an annular plate moved together with said second button; and a plurality of transmission mechanisms which are respectively incorporated with said lock pins, each transmission mechanism moving the corresponding lock pin to the projected position when actuated by said circular plate and permitting the lock pin to return to the retracted position with an aid of said elastic band when actuated by said annular plate.

6. A holder as claimed in claim 5, in which said transmission mechanism comprises:

a swing lever pivotally connected to the cylindrical base body and having first, second and third arms, each arm being equipped at a leading end with a roller, the roller of the first arm being in contact with said circular plate and the roller of the third arm being engageable with said annular ring;

a press lever pivotally connected to the cylindrical base body and having a longer first arm and a shorter second arm, said longer first arm having a cam portion engageable with the roller of said second arm of said swing lever, said shorter second arm being equipped at a leading end with a roller which is constantly engaged with an inner end of one of the lock pins; and a coil spring held by the cylindrical base body for biasing the longer first arm of said press lever toward said swing lever.

7. A holder as claimed in claim 6, further comprising a first biasing means which biases said first button toward the depressed position and a second biasing means which biases said second button toward the raised position.

8. A holder as claimed in claim 7, in which said first biasing means is a coil spring which is interposed between said circular plate and said cylindrical base body, and in which said second biasing means is a coil spring which is interposed between said second button and said cylindrical base body.

9. A holder as claimed in claim 2, in which said lock pins are arranged in the peripheral portion of said cylindrical base body at evenly spaced intervals.

10. A reel holder for use in a tape winding apparatus having a rotation shaft, a cylindrical drum unit coaxially connected at one axial end thereof to said rotation shaft to rotate therewith;

a plurality of lock pins radially movably mounted in a peripheral portion of said drum unit, each lock pin being axially movable between a projected position wherein an outer end thereof is projected outwardly from a cylindrical outer wall of said drum unit and a retracted position wherein said outer end thereof is retracted into said drum unit;

an elastic band put around said cylindrical outer wall in a manner to cover the outer ends of said lock pins, said elastic band biasing said lock pins toward the retracted position when said lock pins are projected;

a circular button coaxially disposed on the other axial end of said cylindrical drum unit, said circular button having raised and depressed positions with respect to said the other axial end;

an annular button coaxially disposed on the other axial end of said cylindrical drum unit in a manner to concentrically surround said circular button, said annular button having raised and depressed positions with respect to said the other axial end; and a plurality of transmission mechanisms installed in said drum unit and respectively incorporated with said lock pins, each transmission mechanism moving the corresponding lock pin to the projected position against a biasing force of said elastic band when actuated by said circular button and permitting the lock pin to return to the retracted position with an aid of the biasing force of the elastic band when actuated by said annular button.

11. A reel holder as claimed in claim 10, further comprising:

a circular plate which actuates each of said transmission mechanisms when said circular button is moved from said raised position to said depressed position; and an annular ring which actuates each of said transmission mechanisms when said annular button is moved from said raised position to said depressed position.

12. A reel holder as claimed in claim 11, in which said circular plate is located within said drum unit and connected through a single first spindle to said circular button, and in which said annular ring is located within said drum and connected through a plurality of second spindles to said annular button.

13. A reel holder as claimed in claim 12, in which the first and second spindles are axially movably received in respective bores formed in said the other axial end of said drum unit.

14. A reel holder as claimed in claim 13, in which each bore for the first and second spindles is equipped with a linear bush for achieving a smoothed axial movement of the corresponding spindle in the bore.

15. A reel holder as claimed in claim 12, further comprising first biasing means which biases said circular button toward the depressed position and second biasing means which biases said annular button toward the raised position.

16. A reel holder as claimed in claim 15, in which each of said transmission mechanisms comprises:

a swing lever pivotally connected to said drum unit and having first, second and third arms, each arm being equipped at a leading end with a roller, the roller of the first arm being in contact with said circular plate and the roller of the third arm being engageable with said annular ring;

a press lever pivotally connected to said drum unit and having a longer first arm and a shorter second arm, said longer first arm having a cam portion engageable with the roller of said second arm of said swing lever, said shorter second arm being equipped at a leading end with a roller which is constantly engaged with an inner end of one of the lock pins; and a coil spring held by the cylindrical base body for biasing the longer first arm of said press lever toward said swing lever.

17. A reel holder as claimed in claim 16, in which the cam portion of said press lever constitutes a curved wall which faces toward a pivot center of said swing lever, and in which the radius of curvature of said curved wall being equal to the distance between said pivot center and the outermost periphery of the roller of said second arm of said swing lever.

18. A reel holder as claimed in claim 17, in which when said the roller of said second arm of the swing lever is in contact with said cam portion of said press lever, an imaginary circle which includes said curved wall has its center at said pivot center of said swing lever.

* * * * *